United States Patent Office 3,341,506
Patented Sept. 12, 1967

3,341,506
METHOD OF INDUCING CLEAVAGE OF PEROXIDES, HYDRAZINES AND DISULFIDES USING TITANOUS TRIHALIDES
Chi-Hua Wang, Lexington, Mass., assignor to Arthur D. Little, Inc., Cambridge, Mass., a corporation of Massachusetts
No Drawing. Filed May 20, 1963, Ser. No. 281,793
3 Claims. (Cl. 260—88.7)

This invention relates to a method of inducing cleavage of certain compounds to furnish free radicals.

In many reaction systems, and particularly in the polymerization of monomers, e.g., the vinyls, it is desirable to have a mechanism capable of furnishing a source of free radicals. One way of accomplishing this has been through thermal decomposition or photo dissociation of organic labile compounds such as azo or peroxy compounds or peresters. The need for supplying an external source of radiant energy, whether in the form of heat or light, may sometimes limit the application of reactions which depend upon the provision of free radicals. As an example, it is highly desirable to be able to accomplish bulk polymerization of a monomer in situ, such as on a boat hull frame where the polymer is to be used to reenforce glass fibers. However, it is inconvenient, if not sometimes impossible, to employ heat and/or light as part of the necessary catalyst system. Under these circumstances, as well as in many other cases, it would be desirable to furnish free radical initiators and catalysts through a chemical reaction which can be carried out at room temperatures or even lower.

It is therefore the primary object of this invention to provide a novel chemical reaction for inducing cleavage to form free radicals. It is another object of this invention to provide a source of free radicals through a chemical reaction which may be carried out at room temperatures or below. It is yet another object to provide a new catalytic system for polymerizing monomers in an aqueous medium. Other objects of the invention will in part be obvious and will in part be apparent hereinafter.

The invention accordingly comprises the several steps and the relation of one or more of such steps with respect to each of the others thereof, which will be exemplified in the method hereinafter disclosed, and the scope of the invention will be indicated in the claims.

I have found that it is possible to induce cleavage of water-soluble peroxides, water-soluble hydrazines and water-soluble organic disulfides in an aqueous medium by the addition of a water-soluble titanous trihalide to the aqueous system.

The bond cleavage which takes place may be postulated to be as follows:

$$RX\text{---}XR + Ti^{+3} \rightarrow RX^- + RX^\circ + Ti^{+4}$$

where X is selected from the group consisting of oxygen, nitrogen and sulfur and R is of such a character that the peroxide, hydrazine and disulfide are at least partially water-soluble.

The reactions giving rise to this free radical generation proceed at room temperatures and even below room temperature. They are preferably carried out under substantially oxygen-free conditions such as in an evacuated atmosphere or under an inert gas such as argon or nitrogen.

The titanous trihalide, which is preferably titanous trichloride, and the RX—XR component are preferably used in equal molar quantities, but an excess of the RX—XR component may be employed. The reaction medium must be water or an aqueous liquid. With the moieties formed by the dissociation are used in a second reaction system, e.g., polymerization, then the second reaction system is suspended or at least partially dissolved in the aqueous reaction medium.

The titanous component is preferably first introduced into the reaction medium and then the RX—XR component added. However, this order may be reversed.

The following examples are given to further the method of this invention, and they are meant to be illustrative and not limiting.

In order to obtain visual evidence of the generation of free radicals, they were used in the polymerization of a vinyl monomer. The monomer was dissolved in water (5% solution) and into this solution was introduced titanous trichloride. This mixture was placed in one arm of a two-arm tube and the RX—XR component, dissolved or suspended in water, in the other arm. The tube was evacuated to about $10^{-2}$ mm. Hg and then was tilted to introduce the RX—XR solution into the monomer solution. Polymerization was indicated by the appearance of turbidity in the mixture which in turn was an indication of the dissociation or cleavage of the RX—XR component into $RX^-$ and $RX^\circ$ to supply reactive sites for catalyzing the polymerization.

| Ex. No. | Monomer | RX—XR Component | Polymerization |
|---|---|---|---|
| 1 | Acrylonitrile | Bis(4-4'-carboxylphenyl)disulfide | Yes. |
| 2 | Acrylamide | Hydrogen peroxide | Yes. |
| 3 | Acrylonitrile | Hydrazine | Yes. |
| 4 | ---do--- | Phenyl hydrazine | Yes. |

When stannous chloride or cobaltous acetate was substituted for the titanous trichloride no polymerization took place. Thus the reaction appears to be peculiar to the water-soluble titanous trihalides.

The vinyl monomers which may be polymerized at room temperature by the method of this invention are those having the structure

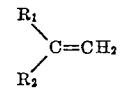

where $R_1$ may be hydrogen, alkyl, aryl, substituted aryl, or halogen, and $R_2$ may be hydrogen, COOH, CONH$_2$, CN, halogen or an ester grouping COOR$_3$ in which $R_3$ is alkyl. Among the monomers which fall within this definition are the styrenes and substituted styrenes, the monomeric acrylic acids and the monomeric derivatives of acrylic and substituted acrylic acids, such as amides, nitriles, esters and halides; the vinyl halides and acetates; and the vinylidenes. The esters of the acrylic acid are those of the monohydric aliphatic alcohols, including for example, methyl, ethyl, N-propyl, isopropyl, N-butyl, secondary butyl, N-hexyl, N-octyl, N-nonyl, N-decyl, N-tetradecyl and N-hexadecyl.

It will be seen from the above description and examples that the method of this invention provides a way of cleaving certain compounds through a unique reaction which takes place at room temperature. Moreover, it also provides an effective catalytic system for the polymerization of monomers in an aqueous liquid medium.

It will thus be seen that the objects set forth above among those made apparent from the preceding description are efficiently attained and since certain changes may be made in carrying out the above method without departing from the scope of the invention, it is intended that all matter contained in the above description shall be interpreted as illustrative and not in a limiting sense.

I claim:
1. A method of providing in an aqueous medium a catalyst system comprising free radicals capable of polymerizing vinyl monomers, consisting of the step of adding separately to said aqueous medium (1) a water-soluble compound of the general formula, RX—XR, wherein X is oxygen, nitrogen, or sulfur and R is the residue of a peroxide, a hydrazine or an organic disulfide, and (2) a water-soluble titanous trihalide whereby there is provided as the catalyst system $RX^- + RX^\circ + Ti^{+4}$.
2. Method in accordance with claim 1 wherein said titanous trihalide is trichloride.
3. Method in accordance with claim 1 wherein said step is carried out under substantially oxygen-free conditions.

References Cited
UNITED STATES PATENTS

| | | | |
|---|---|---|---|
| 2,529,315 | 11/1950 | Serniuk | 260—88.7 |
| 2,610,965 | 9/1952 | Vandenberg | 260—88.7 |
| 2,729,624 | 1/1956 | Howard | 260—88.7 |
| 2,813,849 | 11/1957 | Kern | 260—88.7 |
| 2,926,160 | 2/1960 | Kern | 260—88.7 |
| 2,979,532 | 4/1961 | MacGregor | 260—608 |
| 3,022,351 | 2/1962 | Mihm et al. | 260—608 |
| 3,088,939 | 5/1963 | Miller | 260—88.7 |
| 3,098,060 | 7/1963 | Miller | 260—88.7 |
| 3,117,111 | 1/1964 | Natta et al. | 260—88.7 |

JOSEPH L. SCHOFER, *Primary Examiner.*

DONALD CZAJA, *Examiner.*

H. WONG, *Assistant Examiner.*